United States Patent [19]
Katayama

[11] Patent Number: 6,070,220
[45] Date of Patent: May 30, 2000

[54] JUMP CODE GENERATOR, INTERRUPT PROGRAM SELECTION SYSTEM, INTERRUPTION PROGRAM SELECTION METHOD, AND COMPUTER WITH THE FUNCTION

[75] Inventor: Isao Katayama, Tokyo, Japan

[73] Assignee: Kabushiki Kaisha Toshiba, Kawasaki, Japan

[21] Appl. No.: 08/987,211

[22] Filed: Dec. 9, 1997

[30] Foreign Application Priority Data

Dec. 9, 1996 [JP] Japan ................................. 8-328565

[51] Int. Cl.[7] .............................. G06F 9/46; G06F 9/48
[52] U.S. Cl. ...................... 710/264; 710/262; 712/242
[58] Field of Search ................................. 710/260, 266, 710/269, 264, 48, 262; 711/220; 712/233, 242

[56] References Cited

U.S. PATENT DOCUMENTS

3,665,415  5/1972  Beard et al. ............................ 710/261
4,459,657  7/1984  Murao ..................................... 711/220
5,155,853  10/1992  Mitsuhira et al. ...................... 710/261

Primary Examiner—Gopal C. Ray
Attorney, Agent, or Firm—Foley & Lardner

[57] ABSTRACT

An interrupt program selection system which is provided with a central processing unit executing various types of control programs stored in a storage unit and which accepts an interrupt processing request from an external unit and selects from the storage unit an interrupt program corresponding to the accepted request comprises an interrupt request controller, a conversion table, and a jump code generating module. The interrupt request controller selects a highest-priority processing request from a plurality of interrupt processing requests. The conversion table contains start addresses of a plurality of interrupt programs corresponding to a plurality of interrupt processing requests. The jump code generating module generates a jump code which may be executed directly by the central processing unit as an instruction based on the start address of the interrupt program corresponding to the accepted interrupt processing request, and places the generated code in a memory space in the storage unit.

15 Claims, 11 Drawing Sheets

JUMP CODE GENERATOR, INTERRUPT PROGRAM SELECTION SYSTEM, INTERRUPTION PROGRAM SELECTION METHOD, AND COMPUTER WITH THE FUNCTION

BACKGROUND OF THE INVENTION

1. Field of the Invention

The present invention relates to a jump code generator provided as a part of interrupt selecting function external to a central processing unit, an interrupt program selection system and an interrupt program selection method for selecting an interrupt program corresponding to an interrupt program execution request and, and a computer with these functions.

2. Description of the Related Art

During program execution, a central processing unit receives interrupt program execution requests from such units as sensors. Upon receiving an interrupt processing request, the central processing unit must identify the cause and select an interrupt program corresponding to the interrupt processing request.

In most cases, the central processing unit has a table (hereafter called a start address table) containing the start addresses of interrupt programs, each corresponding to a particular type of interrupt request, so as to immediately switch to execution of an interrupt program (first conventional system). When the central processing unit receives an interrupt request, it passes control to the corresponding interrupt program.

Figure 1:
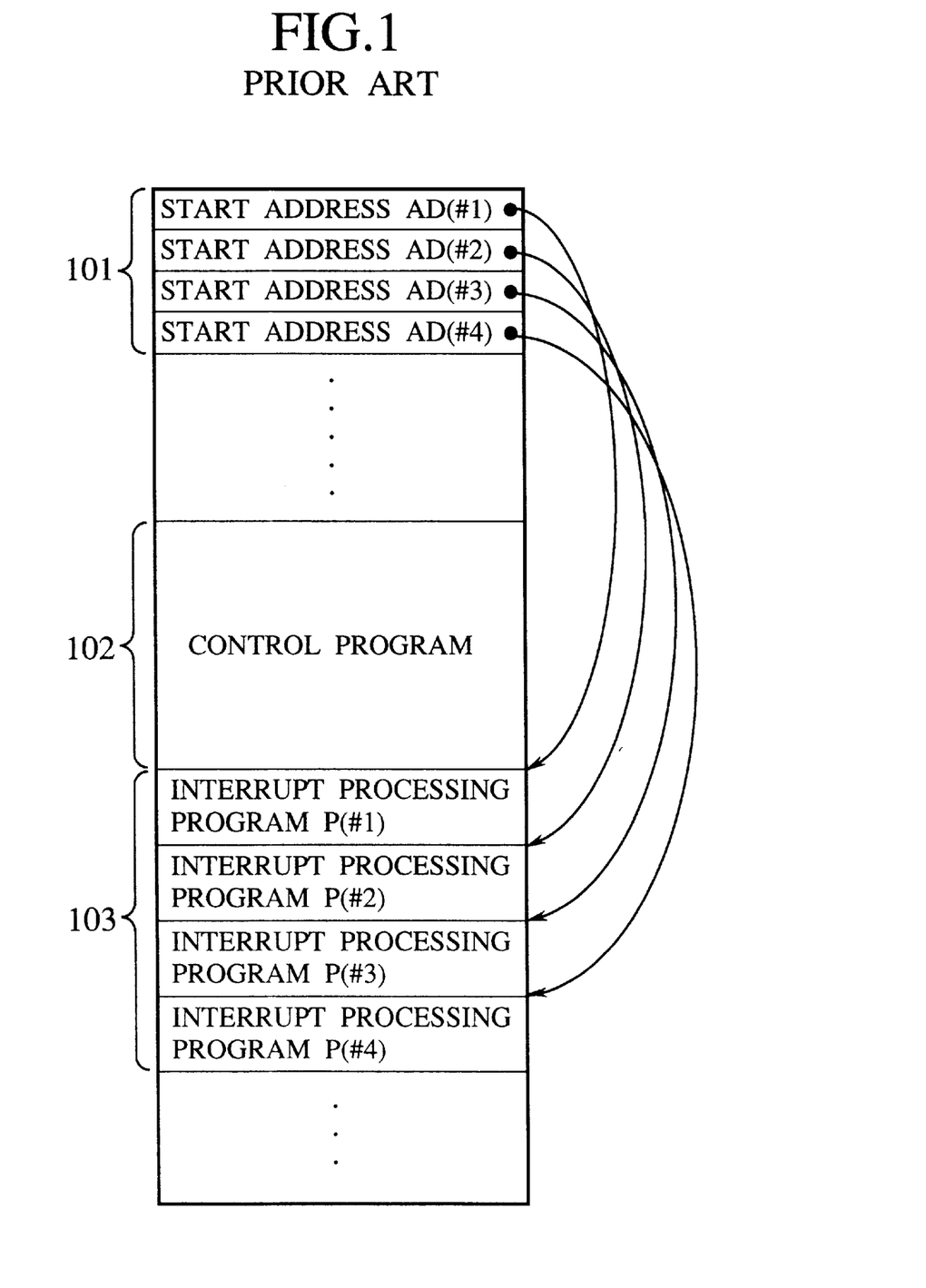
FIG. 1 is a diagram showing the concept of an interrupt program selection function of a central processing unit in a first conventional system.

FIG. 1 is a diagram showing the concept of the interrupt program selection function of the central processing unit in a conventional system.

As shown in the figure, the storage area of the storage unit used by the central processing unit contains an execution start-address table 101 which contains the execution start-addresses AD (#1) to AD (#4) corresponding to interrupt processing requests #1, #2, #3, and #4, a control program storage area 102 in which the control program resides, and an interrupt program storage area 103 in which interrupt programs P (#1) to P (#4) reside.

When an interrupt processing request is received from an external unit, an execution start address (e.g., AD (#2)) is read from the execution start-address table 101 and is set in a program counter in the central processing unit. An interrupt program P (#2), specified by the execution start address AD (#2), is then read from the interrupt program storage area 103 for execution by the central processing unit.

However, in many cases, some central processing units which are designed to aim high-speed processing of normal processes, such as a reduced-instruction set computer, bypass the above-described interrupt program selection function because of its complexity. As an alternative, these central processing units execute a program (interrupt service routine) common to all types of interrupt requests. This program identifies the cause of an interrupt and passes control to a corresponding interrupt program, implementing the interrupt program selection function by means of software (second conventional system).

Figure 2:
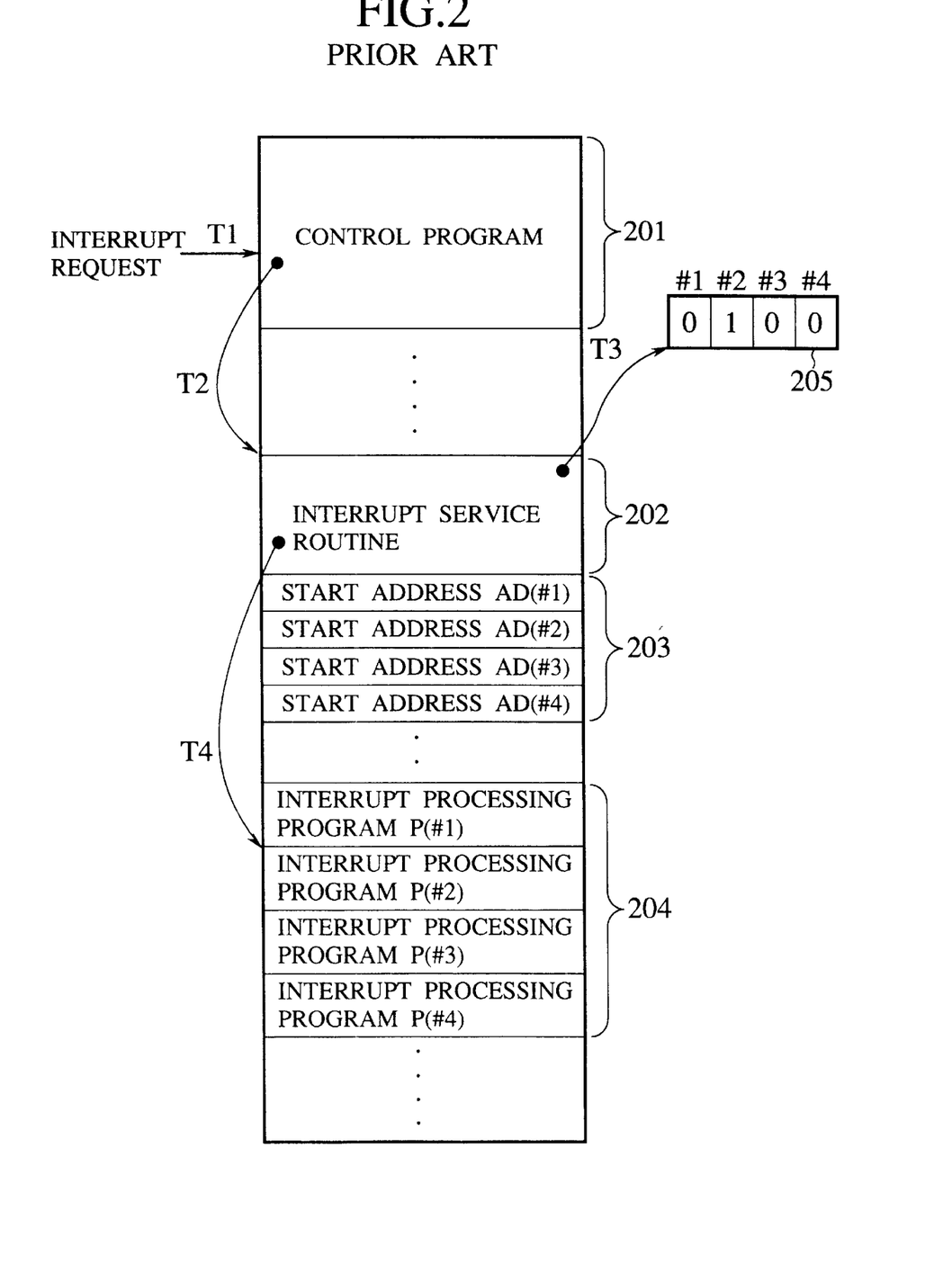
FIG. 2 is a diagram showing the concept of an interrupt program selection function of a second conventional system.

FIG. 2 is a diagram showing the concept of the interrupt program selection function of the second conventional system.

As shown in the figure, the storage area of the program storage unit used by this type of central processing unit includes a control program storing area 201 for storing a control program, an interrupt service routine storing area 202 for storing an interrupt service routine, an address table 203 containing data items, AD (#1) to AD (#4), for the start addresses of interrupt programs corresponding to interrupt processing requests #1, #2, #3, and #4, and an interrupt programs storing area 204 for storing interrupt programs P (#1) to P (#4) corresponding to interrupt processing requests #1 to #4.

When the central processing unit receives an interrupt processing request (T1 in FIG. 2) from an external unit, it interrupts the control program in execution stored in the control program storing area 201 and starts the interrupt service routine stored in the interrupt service routine storing area 202 (T2). This interrupt service routine checks the content of an interrupt request hold register 205 which stores the accepted interrupt number as a flag (T3). Based on the accepted interrupt number (for example, #2), the central processing unit gets the interrupt handler start address of interrupt number #2 from the address table 203, and passes control to the corresponding interrupt program (T4).

Figure 3:
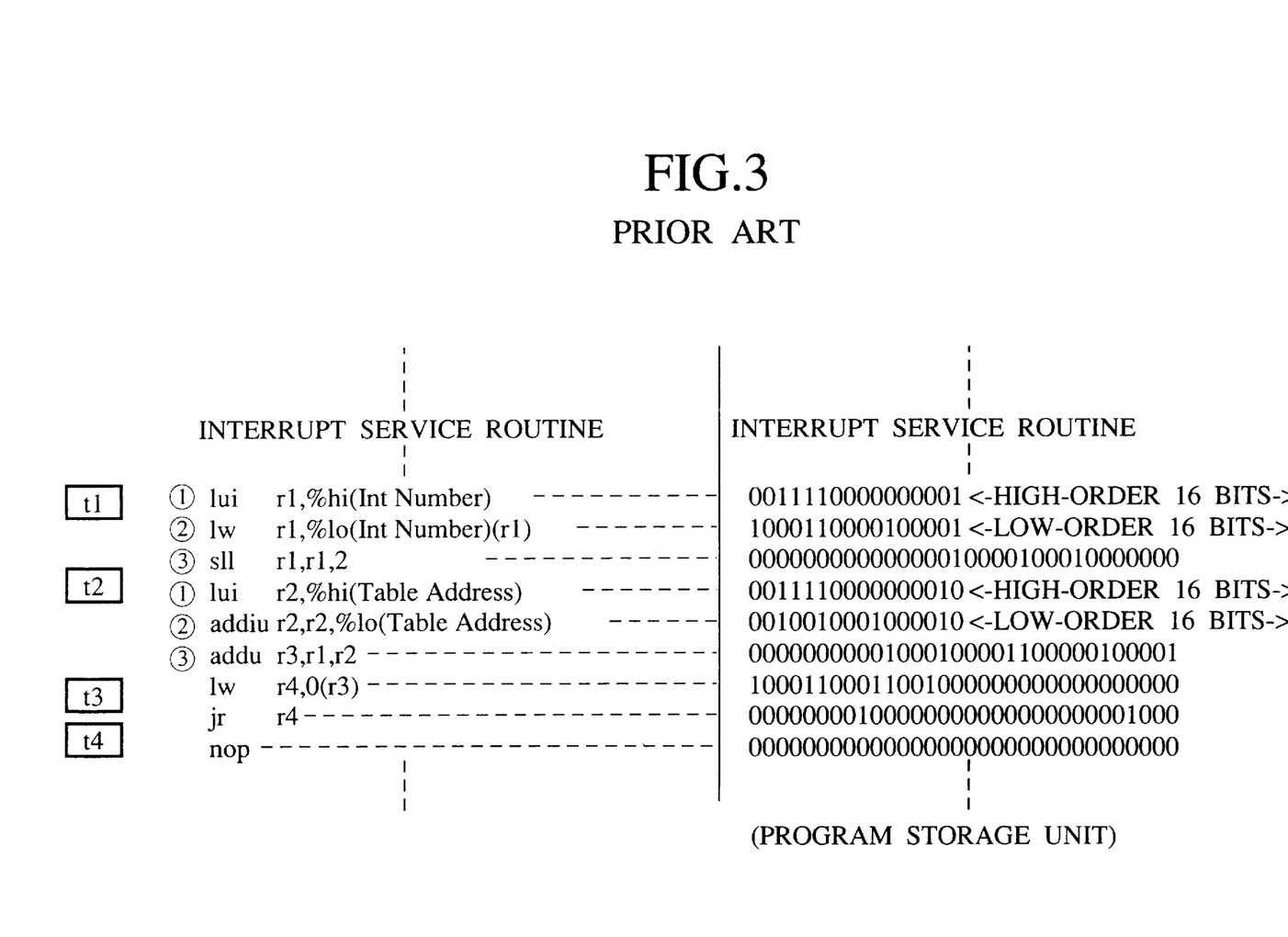
FIG. 3 is a diagram showing an example of an interrupt service routine used in the second conventional system.

The following explains more in detail the interrupt service routine, the key routine of the software-controlled interrupt program selection function, by referring to FIG. 3.

FIG. 3 shows an example of an interrupt service routine used in the above-described second conventional system. It contains coding in the interrupt service routine for selecting an interrupt processing program and for passing control to the selected interrupt processing program.

In the figure, r1 to r4 are general-purpose registers (32 bits each) and IntNumber indicates a memory address at which an interrupt number is stored. TableAddress indicates the start address of the address table 203.

During processing t1 in the interrupt service routine, an interrupt number is obtained. First, in step ① in processing t1, the content of the high-order 16 bits of IntNumber is stored in the high-order 16 bits of general-purpose register r1. In step ②, the value of the area pointed to by the content of general-purpose register r1 is stored in general-purpose register r1. Because general-purpose register r1 contains the memory address at which the interrupt number is stored, the interrupt number is stored in general-purpose register r1. That is, in steps ① and ②, the content of the area pointed to by IntNumber, i.e., the interrupt number, is stored in general-purpose register r1. In step ③, the content of general-purpose register r1, which is the interrupt number, is multiplied by the number of bytes of an element of the address table 203 so that the corresponding address is indexed. In this case, an element of the address table 203 is composed of four bytes.

In processing t2, the address of an interrupt program is calculated. In step ① in processing t2, the content of the high-order 16 bits of TableAddress is stored in the high-order 16 bits of general-purpose register r2. In step ②, the content of the low-order 16 bits of TableAddress is added to the low-order 16 bits of general-purpose register r2. In steps ① and ② in processing t2, the value of TableAddress is stored in general-purpose register r2. In step ③, the address at which the start address of the interrupt program corresponding to the interrupt is stored is calculated.

In processing t3, the content stored at the address calculated in step ③ in processing t2 is read (The start address of the interrupt program is obtained).

In processing t4, control jumps to the address obtained in processing t3. (jump to the interrupt program).

However, as shown in the second conventional system described above, software implementation of the interrupt program selection function for selecting an interrupt program upon receiving an interrupt request is complicated, thus degrading a response to an interrupt request.

SUMMARY OF THE INVENTION

The present invention seeks to solve the problems associated with prior arts described above. It is an object of the present invention to provide a jump code generator which converts the start address of an interrupt program corresponding to an interrupt processing request into a jump code which can be directly executed by the central processing unit as an instruction. It is another object of the present invention to provide an interrupt program selection system and an interrupt program selection method which perform the program selection function without degrading a response to an interrupt request in a central processing unit which has no interrupt program selection function. It is still another object of the present invention to provide a computer with the interrupt program selection system or the interrupt program selection method.

To achieve above objects, there is provided a jump code generator provided with a central processing unit which executes a plurality of control programs stored in a storage unit, wherein the jump code generator converts a start address of an interrupt program corresponding to an accepted interrupt processing request into a jump code directly executable by the central processing unit and outputs the jump code.

The present invention causes the jump code generator, one of hardware components, to generate a jump code which passes control directly to the interrupt program, allowing control to be jumped directly to the interrupt program.

To achieve the above objects, there is provided a jump code generator provided with a central processing unit which executes a plurality of control programs stored in a storage unit, the jump code generator comprising a table containing start addresses of a plurality of interrupt programs corresponding to a plurality of interrupt processing requests; and a jump code generating module for generating a jump code which can be executed directly by the central processing unit as an instruction based on a start address of an interrupt program corresponding to an accepted interrupt processing request and for placing the generated jump code in a memory space in the storage unit.

The present invention causes the jump code generator, one of hardware components, to generate a jump code and to place the jump code in a part of the memory space of the storage unit, allowing control to jump directly to the interrupt program easily and reliably.

In a preferred embodiment of the present invention, the jump code generator is a jump code generator, further comprising a register to which an address in the memory space in the storage unit is assigned, wherein the jump code generating module stores the start address of the interrupt program corresponding to the entered interrupt processing request and a non-address value necessary for generating the jump code into the register to generate the jump code.

In a preferred embodiment of the present invention, the jump code generator is a jump code generator, wherein the non-address value necessary for generating the jump code is stored in advance in the register.

In a preferred embodiment of the present invention, the jump code generator is a jump code generator, further comprising a register to which an address in the memory space in the storage unit is assigned, wherein the jump code generating module stores only the start address of the interrupt program corresponding to the entered interrupt processing request into the register to generate the jump code.

To achieve the above objects, there is provided an interrupt program selection system which is provided with a central processing unit executing a plurality of control programs stored in a storage unit and which accepts an interrupt processing request from an external unit and selects from the storage unit an interrupt program corresponding to the accepted request, the interrupt program selection system comprising a jump code generator for converting a start address of the interrupt program corresponding to the accepted interrupt processing request into a jump code directly executable by the central processing unit and for outputting the jump code.

When selecting an interrupt program from the storage unit in response to an interrupt processing request from an external unit, the present invention causes the jump code generator, one of hardware components, to generate a jump code, allowing control to jump directly to the interrupt program.

To achieve the above objects, there is provided an interrupt program selection system which is provided with a central processing unit executing a plurality of control programs stored in a storage unit and which accepts an interrupt processing request from an external unit and selects from the storage unit an interrupt program corresponding to the accepted request, the interrupt program selection system comprising an interrupt request controller for selecting a highest-priority interrupt processing request from a plurality of interrupt-enabled interrupt processing requests; a table containing start addresses of a plurality of interrupt programs corresponding to a plurality of interrupt processing requests; and a jump code generating module for generating a jump code which can be executed directly by the central processing unit as an instruction based on a start address of the interrupt program corresponding to the accepted interrupt processing request and for placing the generated jump code in a memory space in the storage unit.

When selecting an interrupt program from the storage unit in response to an interrupt processing request from an external unit, the present invention causes the interrupt request controller and the jump code generator, both of which are hardware components, to generate a jump code which passes control to the interrupt program and to place the generated code in a part of the memory space of the storage unit, allowing control to jump directly to the interrupt program easily and reliably.

To achieve the above objects, there is provided an interrupt program selection method comprising the steps of generating, through a hardware component, a jump code directly executable by a central processing unit as an instruction when an interrupt processing request is accepted from an external unit, based on a start address of an interrupt program corresponding to the accepted interrupt processing request; placing the generated jump code in a memory space of a storage unit as a part of an interrupt service routine commonly executed for all interrupt processing requests by the central processing unit; and starting the interrupt program corresponding to the interrupt processing request when the central processing unit executes the jump code.

The present invention allows the central processing unit to execute a jump code as a part of the interrupt service routine when an interrupt processing request is generated and to start the interrupt program corresponding to the interrupt processing request. This jump code is generated by a hardware component based on the start address of the interrupt program corresponding to the accepted interrupt processing request and is stored in a part of the memory space of the storage unit.

To achieve the above objects, there is provided a computer comprising a storage unit containing various types of control programs; an interrupt program selection system which accepts an interrupt processing request from an external unit and which selects an interrupt program corresponding to the interrupt processing request from the storage unit; and a central processing unit which executes the various types of control programs stored in the storage unit, the interrupt program selected by the interrupt program selection system being one of the various types of control programs, wherein the interrupt program selection system comprising an interrupt request controller for selecting a highest-priority interrupt processing request from a plurality of interrupt-enabled interrupt processing requests; a table containing start addresses of a plurality of interrupt programs corresponding to a plurality of interrupt processing requests; and a jump code generating module for generating a jump code which can be executed directly by the central processing unit as an instruction based on a start address of the interrupt program corresponding to the accepted interrupt processing request and for placing the generated jump code in a memory space in the storage unit.

The nature, principle and utility of the invention will become more apparent from the following detailed description when read in conjunction with the accompanying drawings.

DESCRIPTION OF THE PREFERRED EMBODIMENTS

Figure 4:
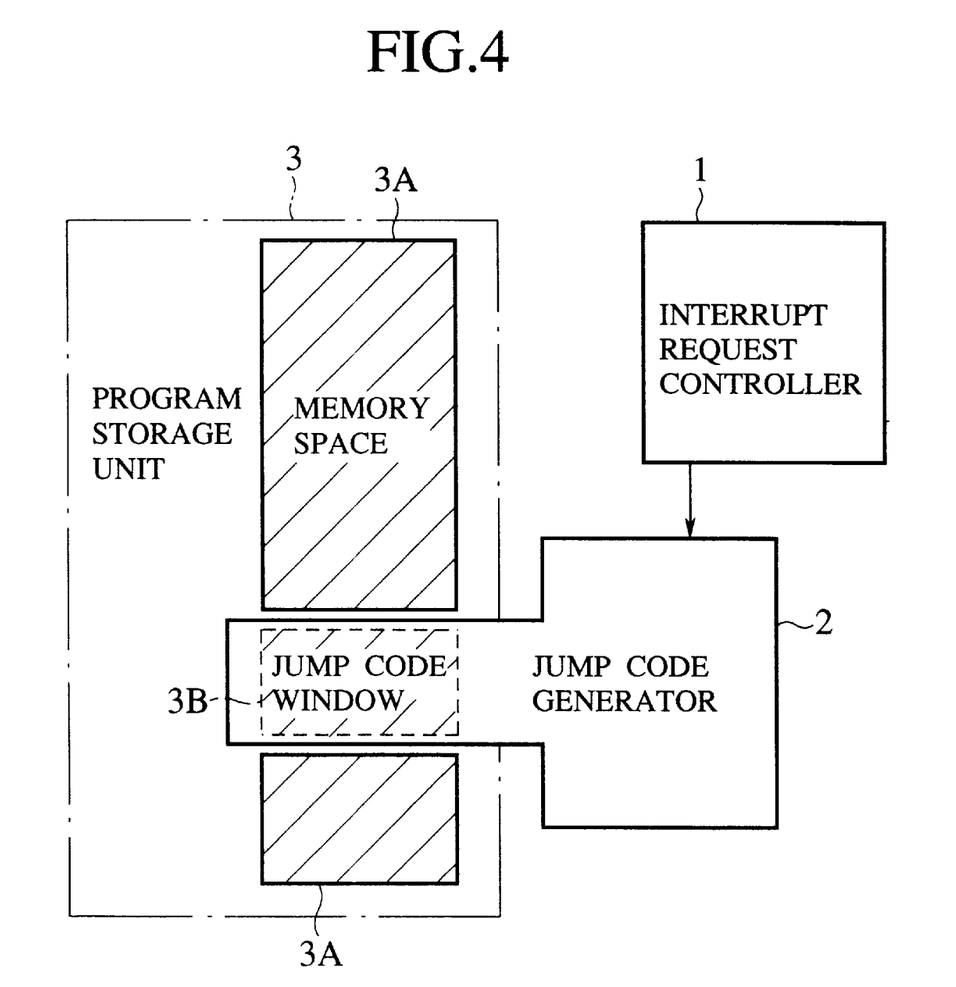
FIG. 4 is a diagram showing the basic principle of a program selection system according to the present invention.

A plurality of embodiments are described below with reference to the drawings. FIG. 4 is a diagram showing the basic principle of an interrupt program selection system according to the present invention.

The interrupt program selection system according to the present invention comprises an interrupt request controller 1 and a jump code generator 2. The interrupt request controller 1 controls interrupt priority and interrupt masks. The jump code generator 2 converts an interrupt processing request into an interrupt program start address, and places this program start address in a particular location (hereafter called a jump code window) 3B in a memory space 3A in a program storage unit 3 for use as a jump code executable by the central processing unit.

When an interrupt processing request is generated, the central processing unit executes a program which the jump code generator 2 has placed in the memory space 3A in the program storage unit 3. The central processing unit executes this program as a part of an interrupt service routine common to all interrupt processing requests.

A first embodiment of the present invention based on the above-described principle is described.

Figure 5:
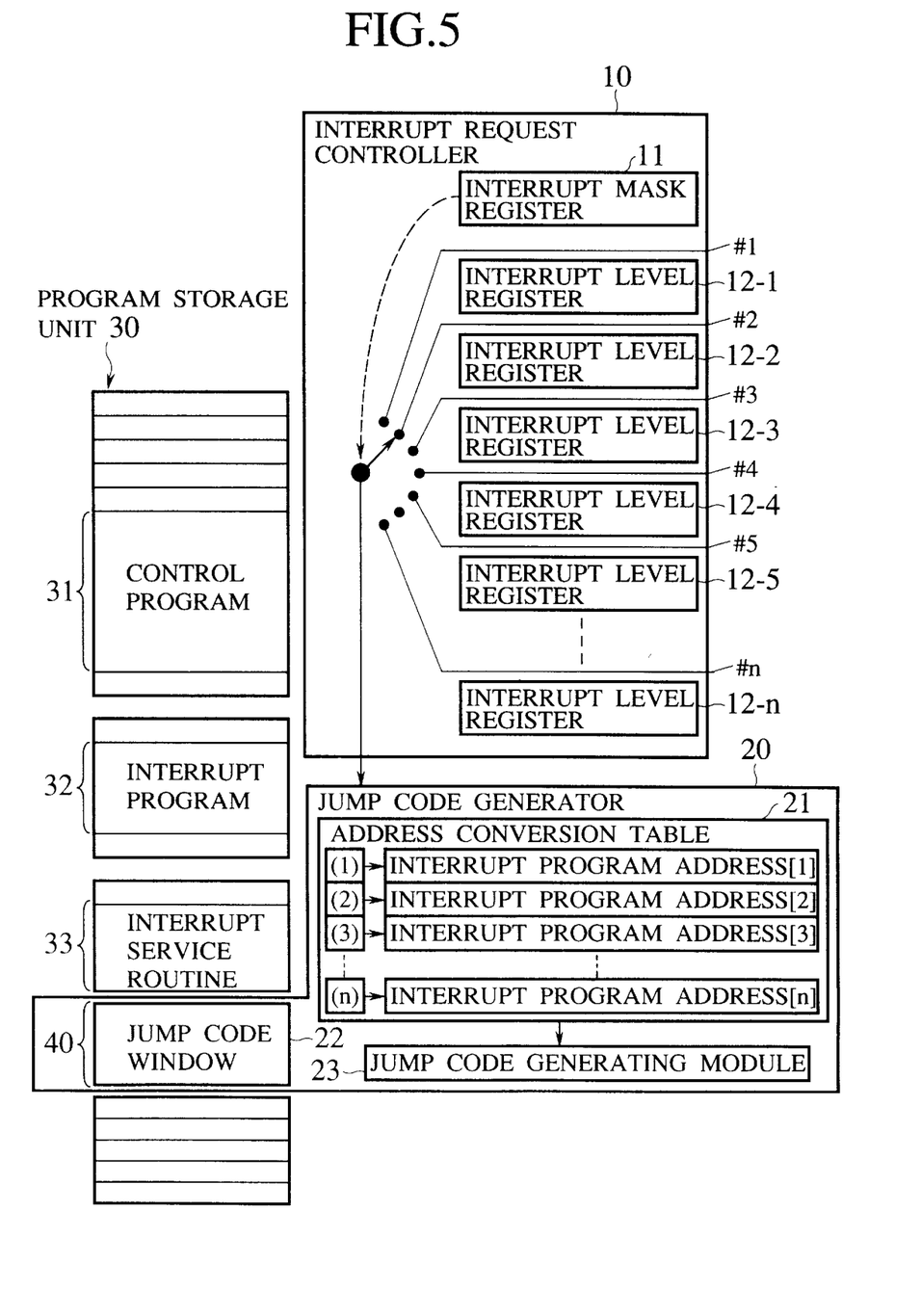
FIG. 5 is a block diagram showing the configuration of an interrupt program selection system in a first embodiment of the present invention.

FIG. 5 is a block diagram showing the configuration of an interrupt program selection system in a first embodiment of the present invention.

This interrupt program selection system comprises an interrupt request controller 10 and a jump code generator 20. In this system, jump codes generated by the jump code generator 20 are stored in a jump code window 40 located at a particular position in the memory space in a program storage unit 30.

The interrupt request controller 10 selects the highest-priority interrupt-enabled interrupt processing request from a plurality of interrupt processing requests #1 to #n. To perform this function, the interrupt request controller 10 has an interrupt mask register 11 which masks a specified interrupt processing request and a plurality of interrupt level registers 12-1 to 12-n which determine interrupt processing request priority.

The jump code generator 20 converts an interrupt processing request, selected by the interrupt request controller 10, into the start address of a corresponding interrupt program, generates a control switching instruction (a jump code) with the generated start address added to it, and maps the generated jump code in a particular location in the memory space in the program storage unit 30. This particular location is, for example, the end of the interrupt service routine that is executed when the central processing unit receives an interrupt processing request.

To do so, the jump code generator 20 comprises an address conversion table 21, a register 22 which stores a jump code (conceptually common to the jump code window 40), and a jump code generating module 23 which generates a jump code. The address conversion table 21 contains interrupt program start addresses, [1], [21], [3], ..., [n], corresponding to interrupt processing requests #1 to #n, with interrupt numbers (1), (2), (3), ..., (n), each identifying an interrupt, as their indexes. The jump code generating module 23 adds a program start address ([1] to [n]) corresponding to the interrupt processing request (#1 to #n), read from the address conversion table 21, to the register 22 to generate a jump code.

Figure 6:
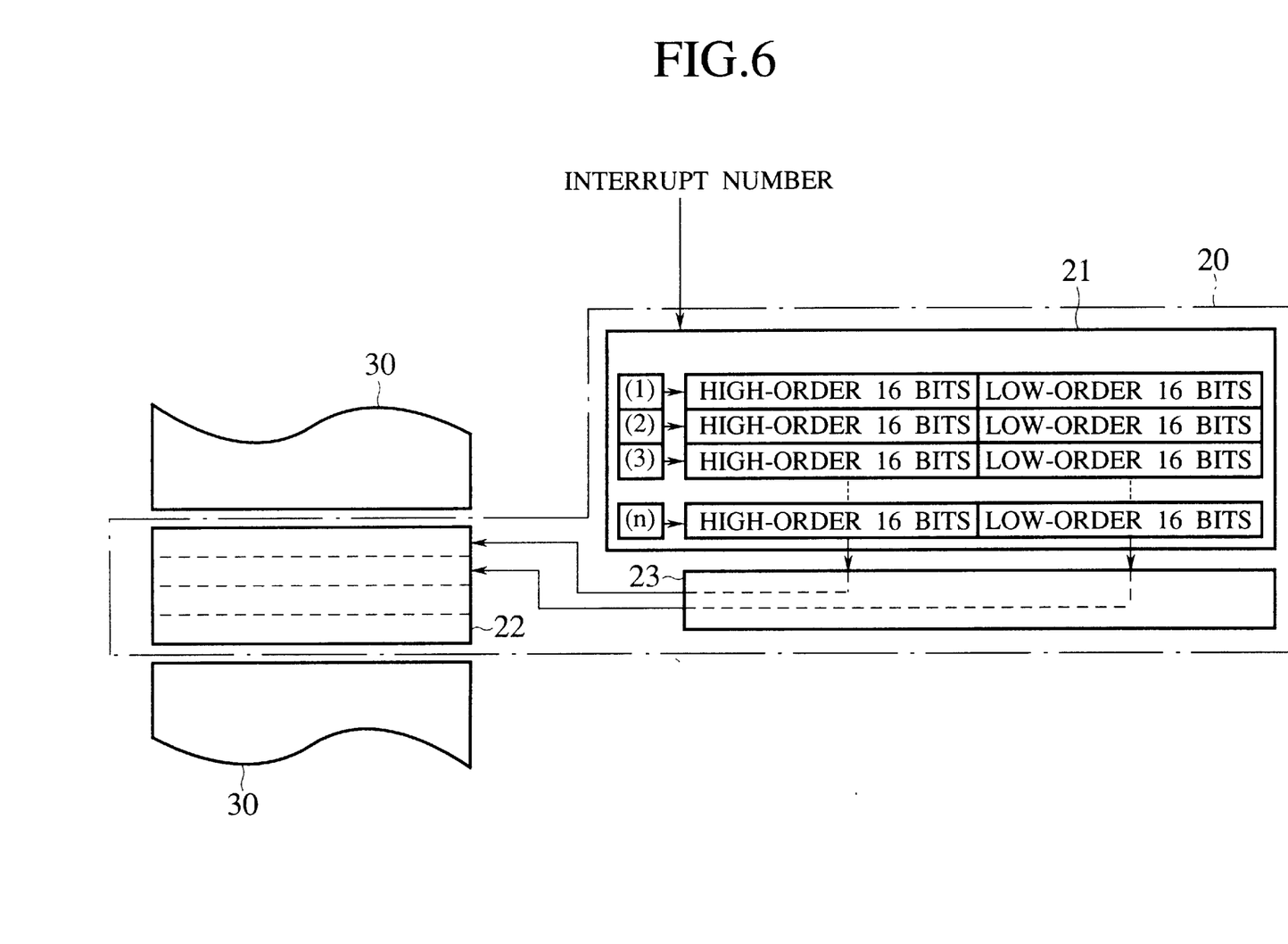
FIG. 6 is a diagram showing the configuration of a jump code generator used in the first embodiment.

More specifically, the address conversion table 21 contains, for example, 32-bit start addresses [1] to [n] corresponding to interrupt numbers (1) to (n), as shown in FIG. 6. The register 22 is a table composed, for example, of four blocks (each block composed of 32 bits). The jump code generating module 23 reads the high-order 16 bits and the low-order 16 bits of a selected start address from the address conversion table 21 and stores the contents of those bits into the register 22. It should be noted that part of the register 22 except the part in which the start address (jump address) always contains a constant value. When a start address is stored from the address conversion table 21 into the register 22, a jump code is generated.

On the other hand, the program storage unit 30 comprises a control program storage area 31 in which control programs (tasks) usually executed by the central processing unit are stored, an interrupt program storage area 32 in which interrupt programs each corresponding to an interrupt processing request are stored, and an interrupt service routine storage area 33 in which the interrupt service routine executed regardless of the cause of an interrupt is stored.

At the end of the interrupt service routine storage area 33 is located the above-described jump code window 40. This jump code window 40 is a memory space area in the program storage unit 30 which is readable from the central processing unit and into which the register 22 within the jump code generator 20 is mapped. That is, the actual area of the jump code window 40 is not provided in the program storage unit 30; it is provided in the register 22 in the jump code generator, a unit separate from the program storage unit 30. The jump code generator 20 outputs a jump code into this jump code window 40 to generate a jump code in a part of the memory space of the program storage unit 30.

Next, the operation of this embodiment is explained with reference to FIG. 7 and FIG. 8.

Figure 7:
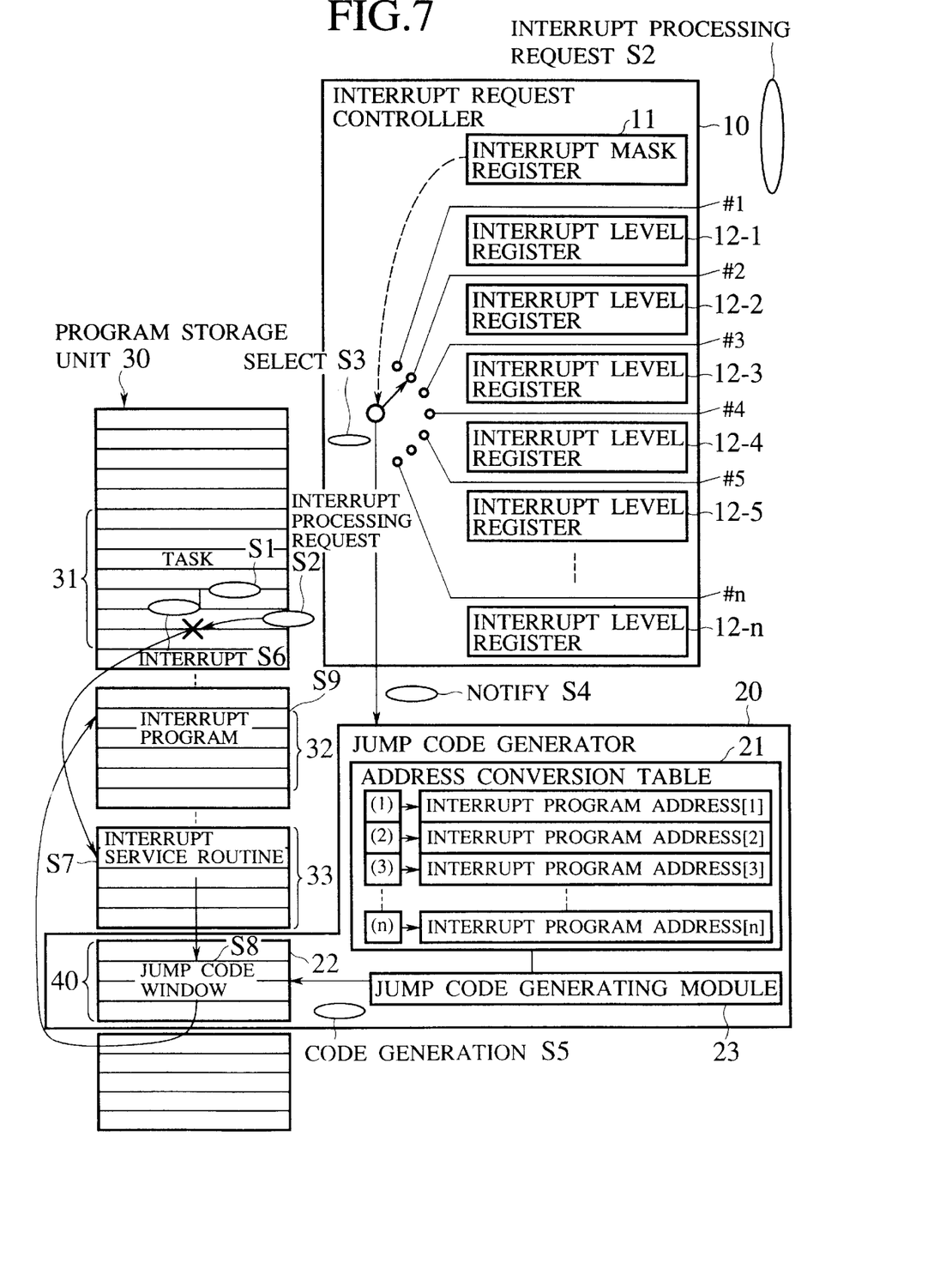
FIG. 7 is a diagram showing the operation of the first embodiment.

FIG. 7 shows how this embodiment operates. It shows an example in which an interrupt occurs while the central processing unit is executing a task for normal processing.

Assume that, when the central processing unit is executing a task (step S1), an interrupt processing request is received from an external unit (step S2).

The interrupt request controller 10 accepts the request only when the received interrupt processing request is not masked. When the interrupt request controller 10 receives a plurality of interrupt processing requests at the same time, it selects the highest-priority interrupt processing request (step S3) and sends the interrupt number to the jump code generator 20 (step S4).

The jump code generator 20 receives the interrupt number and gets an interrupt program start address from the address conversion table 21. It then generates a jump code by putting this start address in the jump code generator 2 (step S5).

More specifically, the high-order 16 bits and the low-order 16 bits of the selected start address are read from the address conversion table 21. Then, for example, the high-order 16 bits of the start address are set in the first block, and the low-order 16 bits in the second block, of the register 22 which is composed of four blocks, as shown in FIG. 6. Because the other field of the register 22 already contains a jump code except the start address, the jump code is completed when the start address is set.

Thus, a jump code generated by the jump code generator 20 is mapped into the jump code window 40 located at the end of the interrupt service routine in the program storage unit 30. The status of the jump code window 40 at this time is shown in FIG. 8.

Figure 8:
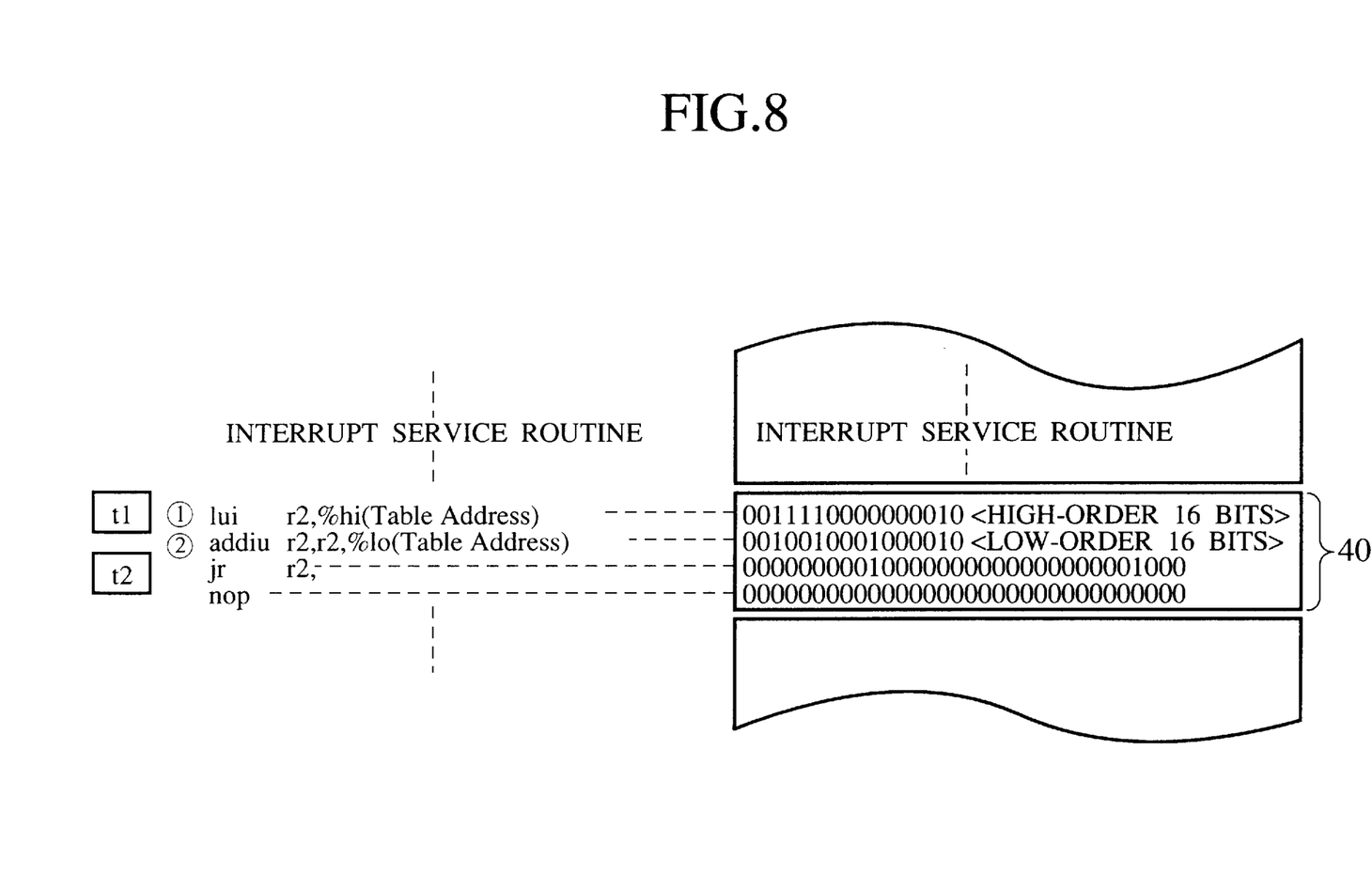
FIG. 8 is a diagram showing the status of a jump code window used in the first embodiment.

In FIG. 8, the portions indicated by <high-order 16 bits> and <low-order 16 bits> are the fields in which the high-order 16 bits and the low-order 16 bits of the selected start address are set.

On the other hand, when an interrupt processing request is generated, the central processing unit interrupts the execution of a task in execution (step S6) and starts the execution of the interrupt service routine (step S7). This interrupt service routine performs processing common to all interrupt programs. At the end of this interrupt service routine is located the jump code window 40. The jump code in this jump code window 40 is executed (step S8) and control is passed to an interrupt program corresponding to the interrupt processing request (step S9).

Normally, the central processing unit reads an instruction from the program storage unit 30 for execution. When the content of a particular address corresponding to the jump code window 40 is read, a jump code is sent from the register 22 of the jump code generator 20, rather than from the program storage unit 30, to the central processing unit for execution.

A sample jump code used in this embodiment is described with reference to FIG. 8.

In jump code processing t1 in this embodiment, the position of the interrupt program is obtained as shown in the figure. First, in step ① in processing t1, the content of the high-order 16 bits of TableAddress is stored in the high-order 16 bits of the general-purpose register r2. In step ②, the content of the low-order 16 bits of TableAddress is stored in the low-order 16 bits of the general-purpose register r2. In steps ① and ② in processing t1, a converted value is sent from the address conversion table 21 to general-purpose register r2. In processing t2, control jumps to the interrupt program.

As described above, this embodiment has the interrupt request controller 10 and the jump code generator 20 outside the central processing unit. The interrupt request controller 10 controls interrupt priority and the interrupt mask. The jump code generator 20 converts an interrupt processing request to the start address of a corresponding interrupt program and generates a jump code in the memory space in the program storage unit 30. When an interrupt processing request is generated, the central processing unit executes a jump code, generated by the jump code generator 20, as a part of the interrupt service routine common to all interrupt requests and executes an interrupt program corresponding to the interrupt processing request.

This means that the jump code generator 20, one of hardware components, generates a jump code which passes control to an interrupt program, making it possible to jump directly to an interrupt program. In the conventional system shown in FIG. 3, such steps as interrupt number acquisition, interrupt program address calculation, and interrupt program address acquisition are performed on a software basis. In this embodiment, these software steps are omitted; they are executed by the hardware.

Next, the second embodiment of the present invention is described.

Figure 9:
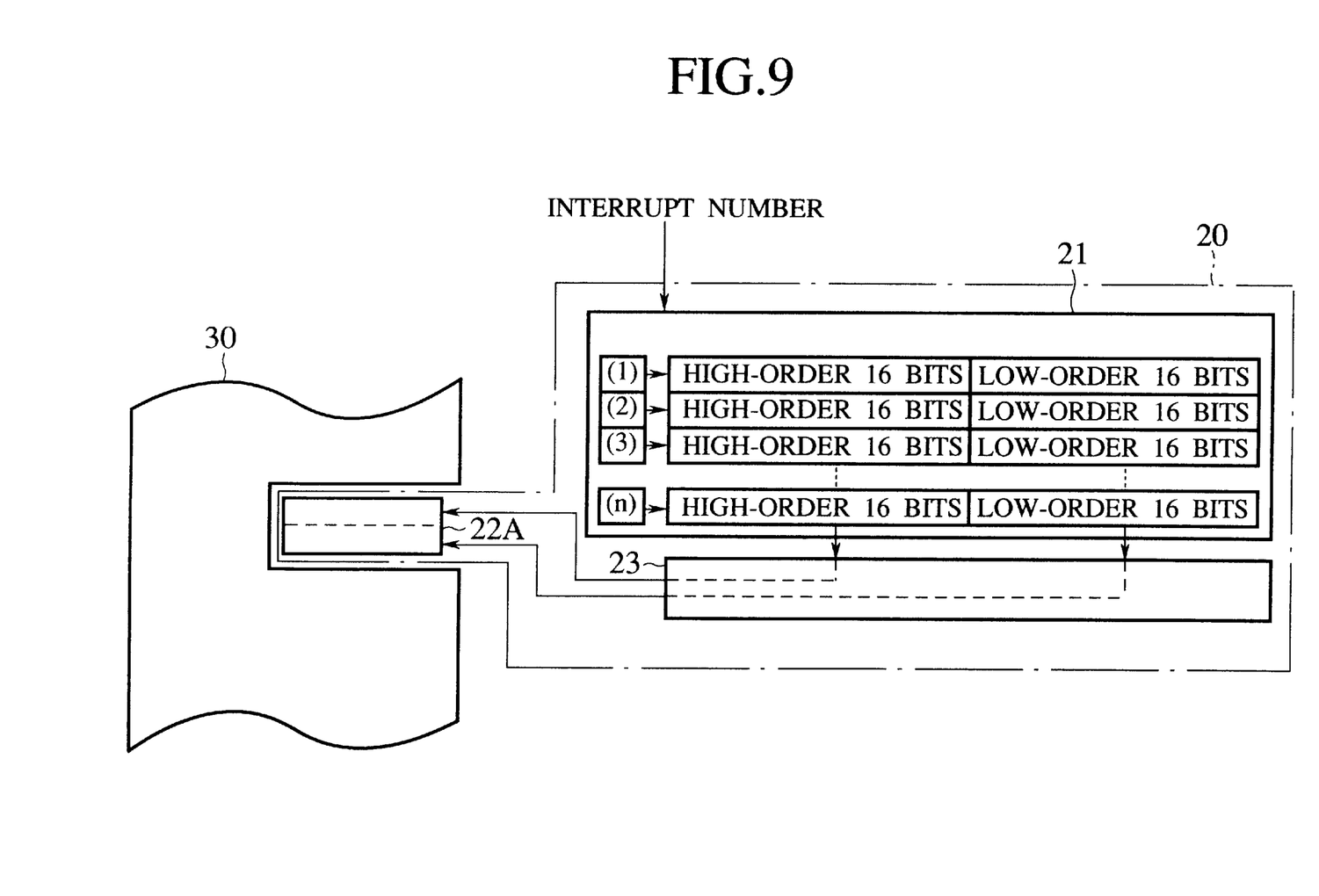
FIG. 9 is a diagram showing the configuration of a jump code generator of a second embodiment of an interrupt program selection system according to the present invention.

FIG. 9 is a diagram showing the configuration of a jump code generator of the second embodiment of the interrupt program selection system according to the present invention. The numbers of components in FIG. 9 corresponding to those in FIG. 4 are the same and the descriptions of such components are not repeated.

Figure 10:
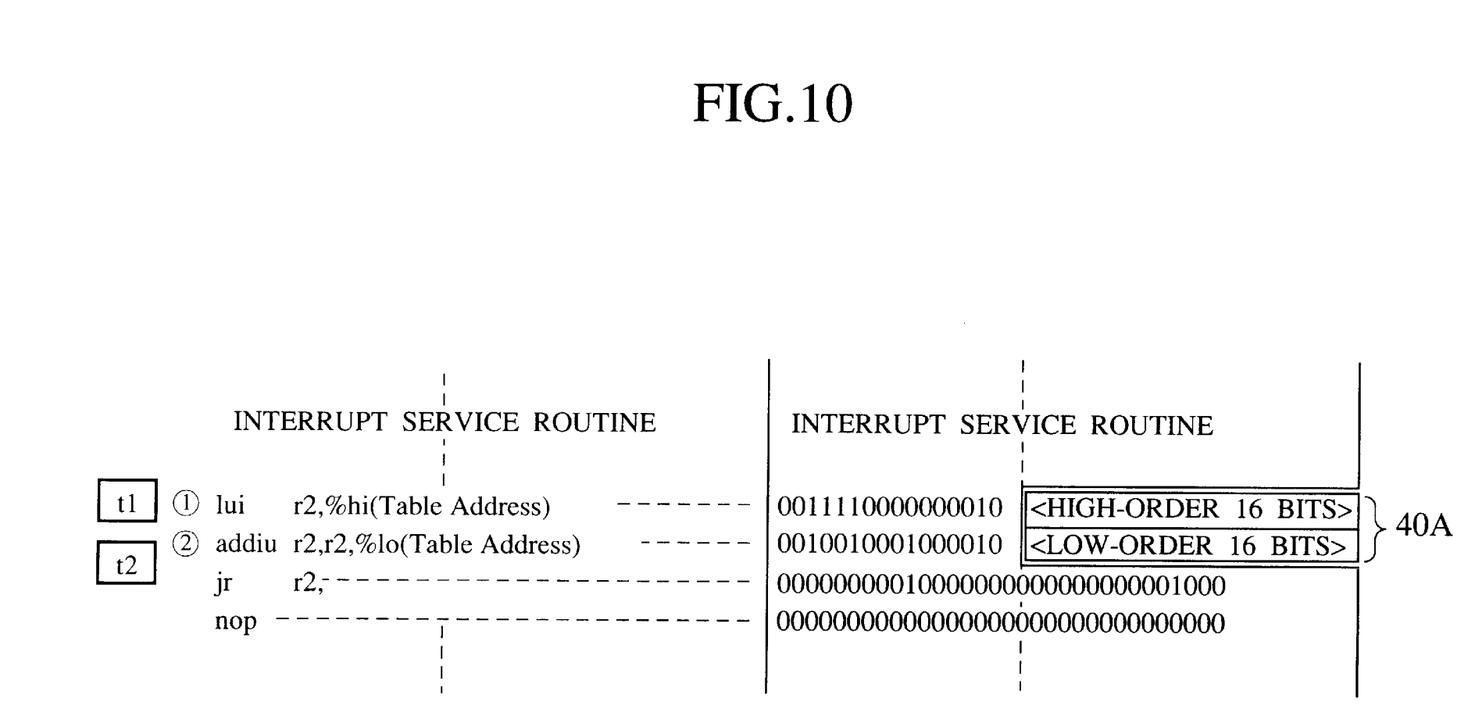
FIG. 10 is a diagram showing the status of a jump code window in the second embodiment.

This embodiment is designed around a concept that a part of a jump code that varies according to an interrupt processing request is limited. The jump code window is set up only for a required part to reduce the size of the register in the jump code generator. Therefore, as shown in FIG. 9, the jump code generator 20 comprises the address conversion table 21, a register 22A in which a converted result from the address conversion table 21 is set, and the jump code generating module 23 which generates a jump code. In addition, as shown in FIG. 10, the low-order 16 bits of the first block and those of the second block in the jump code area in the program storage unit 30 are set up as a jump code window 40A in this embodiment. Other components are the same as those in the first embodiment described above.

On a central processing unit whose instruction size is 32 bits, a 32-bit code is sent from the program storage unit 30 to the central processing unit. When an instruction is read from a jump code area in this embodiment, the content of the jump code window 40A set up in a particular location in the jump code area is replaced by the jump code generator 20.

This embodiment may be applied to a central processing unit on which the address of a jump instruction is specified by the clearly separated high-order 16 bits and low-order 16 bits. In such a case, the jump code window may be set up just in a location where a start address (jump address) is stored. This ensures space usage efficiency.

Figure 11:
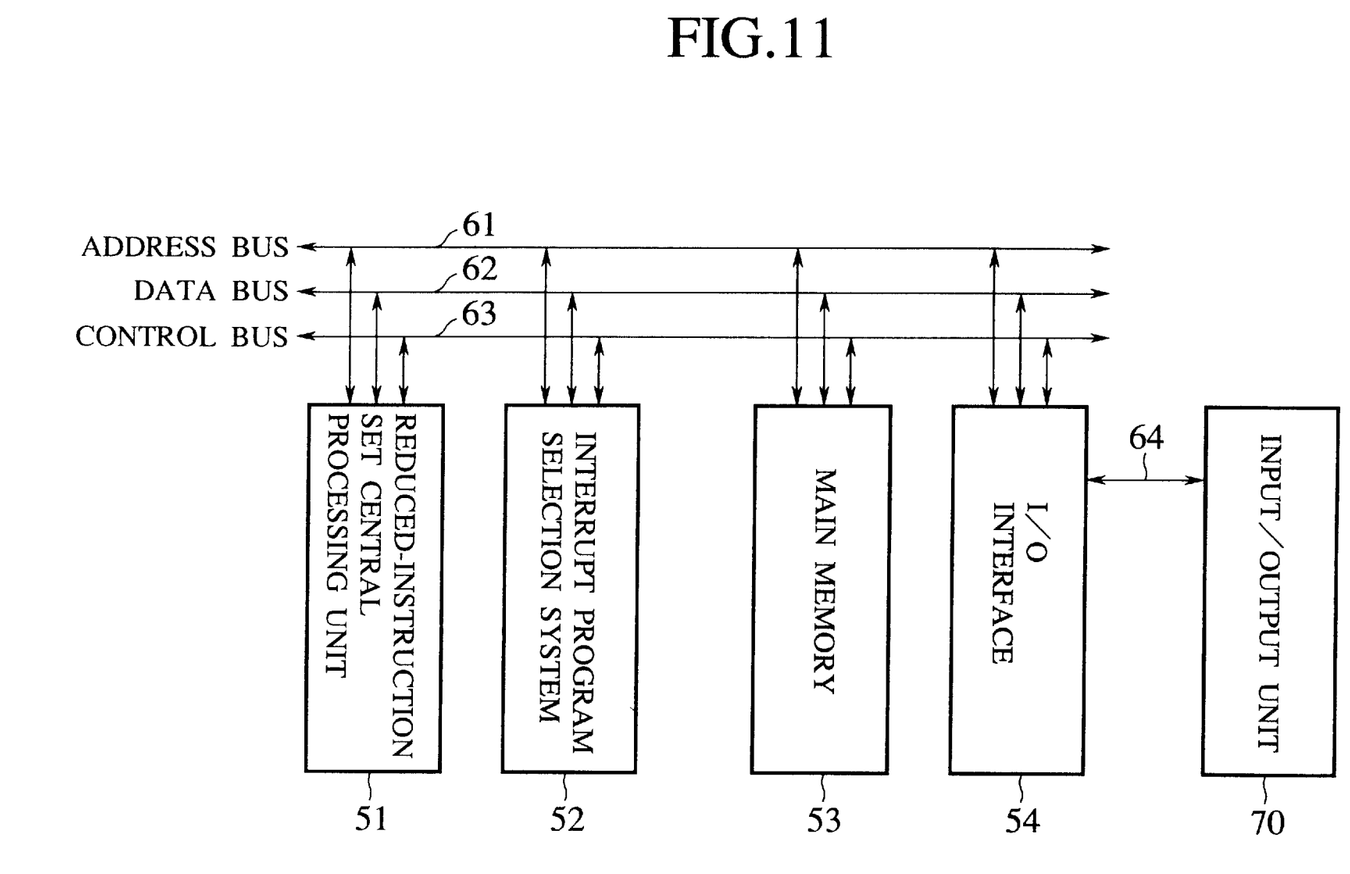
FIG. 11 is a block diagram of an example of a computer on which the program selection system according to the present invention is used.

FIG. 11 is a block diagram of an example of a computer on which the program selection system according to the present invention is used.

In the figure, numeral 51 is a reduced-instruction set central processing unit, and numeral 52 is the interrupt program selection system according to the present invention described in the first and second embodiments. Numeral 53 is a main memory containing the above-described program storage unit 30, and numeral 54 is an I/O interface. These components are interconnected via an address bus 61, a data bus 62, and a control bus 63. In addition, the I/O interface 54 is connected to an input/output unit 70 via an I/O bus 64.

An interrupt processing request is sent, for example, from the input/output unit 70 to the interrupt program selection system 52 and to the reduced-instruction set central processing unit 51 via the I/O interface 54.

It should be understood that many modifications and adaptations of the invention will become apparent to those skilled in the art and it is intended to encompass such obvious modifications and changes in the scope of the claims appended hereto.

What is claimed is:

1. A jump code generator provided with a central processing unit which executes a plurality of control programs stored in a storage unit, wherein said jump code generator converts a start address of an interrupt program corresponding to an accepted interrupt processing request into a jump code directly executable by said central processing unit and outputs said jump code.

2. A jump code generator provided with a central processing unit which executes a plurality of control programs stored in a storage unit, said jump code generator comprising:

a table containing start addresses of a plurality of interrupt programs corresponding to a plurality of interrupt processing requests; and a jump code generating module for generating a jump code which is capable of being executed directly by said central processing unit as an instruction based on a start address of an interrupt program corresponding to an accepted interrupt processing request and for placing the generated jump code in a memory space in said storage unit.

3. A jump code generator according to claim 2, further comprising a register to which an address in the memory space in said storage unit is assigned, wherein said jump code generating module stores the start address of the interrupt program corresponding to the entered interrupt processing request and a non-address value necessary for generating said jump code into said register to generate said jump code.

4. A jump code generator according to claim 3, wherein the non-address value necessary for generating said jump code is stored in advance in said register.

5. A jump code generator according to claim 2, further comprising a register to which an address in the memory space in said storage unit is assigned, wherein said jump code generating module stores only the start address of the interrupt program corresponding to the entered interrupt processing request into said register to generate said jump code.

6. An interrupt program selection system which is provided with a central processing unit executing a plurality of control programs stored in a storage unit and which accepts an interrupt processing request from an external unit and selects from said storage unit an interrupt program corresponding to the accepted request, said interrupt program selection system comprising:

a jump code generator for converting a start address of the interrupt program corresponding to the accepted interrupt processing request into a jump code directly executable by said central processing unit and for outputting said jump code.

7. An interrupt program selection system which is provided with a central processing unit executing a plurality of control programs stored in a storage unit and which accepts an interrupt processing request from an external unit and selects from said storage unit an interrupt program corresponding to the accepted request, said interrupt program selection system comprising:

an interrupt request controller for selecting a highest-priority interrupt processing request from a plurality of interrupt-enabled interrupt processing requests;

a table containing start addresses of a plurality of interrupt programs corresponding to a plurality of interrupt processing requests; and a jump code generating module for generating a jump code which is capable of being executed directly by said central processing unit as an instruction based on a start address of the interrupt program corresponding to the accepted interrupt processing request and for placing the generated jump code in a memory space in said storage unit.

8. An interrupt program selection system according to claim 7, further comprising a register to which an address in the memory space in said storage unit is assigned, wherein said jump code generating module stores the start address of the interrupt program corresponding to the entered interrupt processing request and a non-address value necessary for generating said jump code into said register to generate said jump code.

9. An interrupt program selection system according to claim 8, wherein the non-address value necessary for generating said jump code is stored in advance in said register.

10. An interrupt program selection system according to claim 7, further comprising a register to which an address in the memory space in said storage unit is assigned, wherein said jump code generating module stores only the start address of the interrupt program corresponding to the entered interrupt processing request into said register to generate said jump code.

11. An interrupt program selection method comprising the steps of:

generating, through a hardware component, a jump code directly executable by a central processing unit as an instruction when an interrupt processing request is accepted from an external unit, based on a start address of an interrupt program corresponding to the accepted interrupt processing request;

placing the generated jump code in a memory space of a storage unit as a part of an interrupt service routine commonly executed for all interrupt processing requests by said central processing unit; and starting the interrupt program corresponding to said interrupt processing request when said central processing unit executes said jump code.

12. A computer comprising:

a storage unit containing various types of control programs;

an interrupt program selection system which accepts an interrupt processing request from an external unit and which selects an interrupt program corresponding to the interrupt processing request from said storage unit; and a central processing unit which executes said various types of control programs stored in said storage unit, said interrupt program selected by said interrupt program selection system being one of said various types of control programs, wherein said interrupt program selection system comprising:

an interrupt request controller for selecting a highest-priority interrupt processing request from a plurality of interrupt-enabled interrupt processing requests;

a table containing start addresses of a plurality of interrupt programs corresponding to a plurality of interrupt processing requests; and a jump code generating module for generating a jump code which is capable of being executed directly by said central processing unit as an instruction based on a start address of the interrupt program corresponding to the accepted interrupt processing request and for placing the generated jump code in a memory space in said storage unit.

13. A computer according to claim 12, further comprising a register to which an address in the memory space in said storage unit is assigned, wherein said jump code generating module stores the start address of the interrupt program corresponding to the entered interrupt processing request and a non-address value necessary for generating said jump code into said register to generate said jump code.

14. A computer according to claim 13, wherein the non-address value necessary for generating said jump code is stored in advance in said register.

15. A computer according to claim 12, further comprising a register to which an address in the memory space in said storage unit is assigned, wherein said jump code generating module stores only the start address of the interrupt program corresponding to the entered interrupt processing request into said register to generate said jump code.

* * * * *